Figure 1:
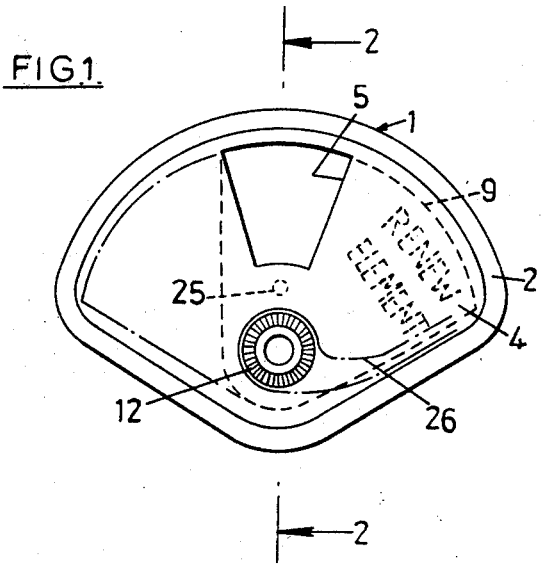

United States Patent [19]
Kemp

[11] 3,916,817
[45] Nov. 4, 1975

[54] PRESSURE RESPONSIVE VISUAL WARNING DEVICES

[75] Inventor: Stanley William Kemp, Southampton, England

[73] Assignee: General Motors Corporation, Detroit, Mich.

[22] Filed: Feb. 13, 1974

[21] Appl. No.: 442,164

[30] Foreign Application Priority Data
Feb. 22, 1973 United Kingdom............. 8694/73

[52] U.S. Cl. ............ 116/70; 116/DIG. 25; 137/557
[51] Int. Cl.² ........................................ G01L 19/12
[58] Field of Search ........ 116/70, 114 AD, DIG. 25; 15/339; 137/557

[56] References Cited
UNITED STATES PATENTS

| | | |
|---|---|---|
| 3,224,264 | 12/1965 | Becciani et al. ................. 116/70 X |
| 3,247,824 | 4/1966 | Rodgers ............................... 116/70 |
| 3,388,682 | 6/1968 | Whiting ............................... 116/70 |
| 3,556,043 | 1/1971 | Vayda.................................. 116/70 |

*Primary Examiner*—Richard C. Queisser
*Assistant Examiner*—Daniel M. Yasich
*Attorney, Agent, or Firm*—P. A. Taucher

[57] ABSTRACT

A visual warning device used, for example, to indicate blockage of an air filter element comprises a housing with an inspection window through which an indicator disc is visible, the disc being pivotally mounted and movable against the action of a spring from a first to a second position in which latter a warning indication is visible through the window, an axially movable pin being arranged so as to latch the indicator disc in one position but release it for pivotal movement when a diaphragm connected to the pin is pulled in one direction in response to a predetermined pressure differential.

3 Claims, 2 Drawing Figures

PRESSURE RESPONSIVE VISUAL WARNING DEVICES

This invention relates to pressure responsive visual warning devices and is suitable in particular for devices intended to provide a visual warning of the condition of a device which requires attention when a predetermined pressure condition has arisen therein. Thus, the invention finds a particular application as a warning indicator for an air filter to warn the operator of an internal combustion engine on which the air filter is fitted that the pressure differential across the filter has become unduly high as the result of the accumulation on the filter element of filtered-out solids.

A pressure responsive visual warning device according to the present invention comprises a housing with an inspection window therein which overlies the base of the housing; an indicator disc pivotally mounted in said housing for movement, against spring bias, from a first to a second position in which a warning indication is respectively concealed from view and visible through the window; a retainer pin mounted in said housing for axial movement parallel to the pivot axis of said disc, between one position in which one end of the pin protrudes through the base of the housing so as to retain the disc against movement from said first position under the bias of the spring and another position in which it is retracted to permit pivotal movement of the disc under the spring bias to said second position; a diaphragm secured at its central portion to the other end of said pin and clamped at its outer periphery between two interfitted peripheral wall portions of a diaphragm chamber having an outlet connectible to a source of fluid pressure, said diaphragm being biased by a spring so as normally to locate said pin in said one position thereof but being movable in response to a predetermined pressure differential across the diaphragm to retract said pin to its other position.

The disc is arranged so as to overlie said one end of the pin and prevent movement to said one position thereof when the pin has been retracted and the disc has moved to its second position; and the disc has a portion which extends through said casing so that the disc can be manually pivoted to its first position in which it permits movement of the pin back to its protruded position in which the disc is held against movement to the second position thereof, under spring bias, by engagement of the pin with the disc. Conveniently, the manually engageable portion of the disc is coaxial with the pivot axis of the disc and is formed as a knurled knob which protrudes from an aperture in said housing. The disc may have an aperture therein through which the pin protrudes, to retain the disc in its first position.

The housing is conveniently formed of plastics material and made as a cup-shaped member with an annular recess adjacent the rim thereof into which a front panel with a viewing window therein can be clipped, the base of the housing being formed with an integral post and the indicator disc being similarly formed of plastics with an integral hub portion which can be snap-fitted over the post so as to be rotatable thereon.

Figure 2:
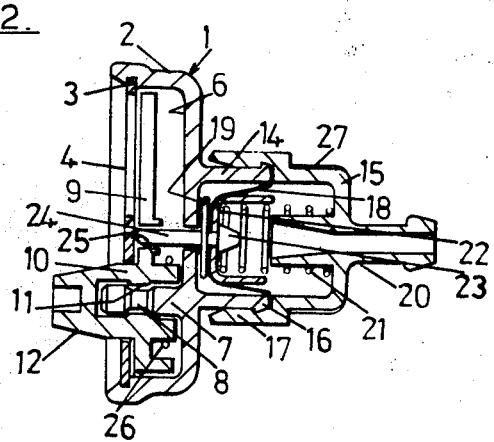

The scope of the invention is defined by the appended claims; and the invention and the method by which it is to be performed are hereinafter particularly described with reference to the accompanying drawings in which:

FIG. 1 is a plan of a pressure responsive visual warning device according to the invention; and
FIG. 2 is a section on the line 2—2 of FIG. 1.

The visual warning device shown in the drawings comprises a housing 1 which is conveniently formed of plastics material and is made as a shallow dished moulding of sector shape the wall 2 of which, adjacent the free edge thereof, is formed with an internal peripheral recess 3 in to which a front panel 4 with a viewing window 5 therein is snap-fitted.

The base 6 of the housing 1 is formed with an integral post 7 which extends normally thereto and intermediate its ends is formed with a smaller diameter neck 8. Pivotally mounted in the housing on the post 7 is an indicator disc 9 which is also conveniently formed as a plastics moulding and has an integral hub portion 10 formed with a coaxial recess which, intermediate its ends, is of reduced diameter so as to form an internal annular bead 11, the hub portion 10 being snap-fitted on to the post 7, and the bead 11 fitting freely in the corresponding annular neck 8 in the post, the indicator disc 9 thereby being rotatably mounted on the post 7. The other end of the hub portion 10 is formed as an externally knurled boss 12 which extends through a corresponding opening formed in the front panel 4 and is manually engageable for rotation of the indicator disc.

The base 6 of the housing 1 has integral therewith an annular wall 14 which extends externally of the base 6 and constitutes one part of a diaphragm chamber, the other part of the diaphragm chamber being formed as a generally cup-shaped plastics moulding 15, the two parts of the diaphragm chamber being formed with complementary inter-fitting annular projections 16, 17 by which the two parts are snap-fitted together with the outer peripheral portion of a flexible diaphragm 18 clamped therebetween and forming a seal therewith. The base of the cup-shaped part 15 of the diaphragm chamber is formed with a coaxial outlet spigot 20 one end portion of which extends within the vacuum chamber 14, 15 and forms a seat for one end of a helical spring 21 the other end of which abuts a cup-shaped retainer 22 which engages the central portion of the diaphragm 18 and is formed with a central opening through which and through a corresponding opening in the diaphragm 18 there is pressfitted a shouldered head 23 on one end of a pin 24, the pin having adjacent said head 23 an annular flange 19 between which and said retainer cup the central portion of the diaphragm is clamped so as to be sealed thereto. The other end of the pin 24 extends through an opening in the base 6 of the housing 1 and is adapted in one angular position of the indicator disc 9 to extend through an opening 25 in the indicator disc.

A spring 26 is mounted on the hub portion 10 of the indicator disc 9, one end of the spring abutting the wall 2 of the housing 1 and the other end thereof engaging one edge of the indicator disc 9 so as to bias the indicator disc for movement in an anti-clockwise direction as viewed in FIG. 1.

The outwardly extending end of the outlet spigot 20 is formed so that a flexible tube (not shown) can be snap-fitted thereon; and adjacent the outlet spigot 20 the cup-shaped portion 15 is formed with an external thread 27 thereon so that the device may be screwed into a corresponding threaded aperture in a part to which the indicator is to be attached. Thus the threaded portion 27 of the diaphragm chamber may be screwed into the threaded end of a fluid conduit connected to an internal combustion engine air cleaner or other device the pressure condition in which is to be indicated by the visual indicator device. Alternatively, the threaded portion 27 may be screwed into an opening in a bracket or other support and the diaphragm chamber be connected to a variable pressure source by a flexible tube fitted on to the outer end of the spigot 20, as aforesaid.

In operation, assuming that the device is arranged with the diaphragm chamber connected so as to be responsive to the pressure condition within an air filter element (that is, on the clean air side of the filter), the diaphragm 18 will be retracted when there is a predetermined vacuum within the air filter element and the pin 24 will thus be moved to its retracted position in which it disengages from the opening 25 in the indicator disc 9 and allows the latter to pivot under the bias of the spring 26 to a position in which a warning indication, such as the words "RENEW ELEMENT" printed on the indicator disc 9, becomes visible through the window in the housing. In this position the disc 9 overlies the end of the pin 24 but is not retained against movement thereby. Subsequent variations in pressure within the air filter element will not affect the position of the indicator disc 9 which will remain in its warning position until manually pivoted by its knurled boss 12 against the bias of said spring 26, to a position in which the pin 24, under the bias of the spring 21 within the diaphragm housing 14, 15, re-engages in the aperture 25 in the disc 9 to secure the latter in its first position, in which the warning indication is concealed from view.

I claim:

1. A pressure responsive visual warning device comprising: a housing having a substantially planar base and a side wall portion extending from said base; a front panel member secured to said side wall in overlying relation to said base and having an inspection window therethrough; an indicator disc pivotally mounted in said housing between said front panel and said base and movable between a first and a second operative position characterized by alignment of a warning indication on said disc with said inspection window when in its second operative position; a spring between said housing and said indicator disc tending to bias said disc to its second operative position; a retainer pin having a first end portion extending through an opening in said base and movable therein in an axial direction parallel to the pivotal axis of said indicator disc; said disc having an opening therein offset from its pivotal axis and coactive with a second end of the retainer pin to hold said pivotal disc in its first operative position against the force of said spring; said base having an annular wall portion extending therefrom on an opposite side from that of said side wall; a generally cup-shaped member cooperative with said annular wall to form a diaphragm chamber therebetween; a flexible diaphragm in said diaphragm chamber and being clamped at its outer peripheral edge between said annular wall portion and said cup-shaped member and being attached at its central portion to the second end of said pin retainer; diaphragm biasing spring means between said cup-shaped member and the central portion of said diaphragm tending to move said diaphragm toward said base to maintain engagement between said second end of the retainer pin and said opening in said disc; passage means between a source of fluid pressure and one side of said diaphragm to produce pressure forces in opposition to the force of said spring on said diaphragm to move said diaphragm and interconnected pin away from said indicating disc permitting said disc to pivot to its second operative position, thus aligning said inspection window and the warning indication on said indicator disc.

2. A pressure-responsive visual warning device comprising: a housing of plastic material having a substantially planar wall forming a base portion, a side wall portion extending from the plane of said base and having an edge portion spaced therefrom; said edge portion having a recess formed therein; a front panel with a peripheral edge secured to said side wall in snap-fitting relation in said recess and being in spaced overlying relation to said base; said front panel having an inspection window therein; an integral post on said base extending toward said front panel; a plastic indicator disc having a hub portion with a bore therein adapted to be snap-fitted over said post and rotatable thereon between a first and a second operative position; said indicator disc having a portion with a warning indication thereon which is concealed from view by the front panel when the disc is in the first operative position and visible through said window when in its second operative position; a spring tending to rotate said disc from its first to its second operative position; a retainer pin extending through an opening in said base toward said front panel and movable therein in an axial direction parallel to the axis of said post from one position in which a first end protrudes into an opening in said indicator disc to another position with said first end disengaged from said indicator disc; said indicator disc overlying said first end of the retainer pin to prevent movement of said pin to its second position until said opening in the indicator disc and said pin are aligned; said hub portion of the indicator disc extending through an opening in said front panel to permit manual rotation of the disc from its second operative position to its first whereby said first end of the pin is permitted to move back to its protruding position in which the disc is held against movement to the second position thereof; a flexible diaphragm secured at its central portion to the other end of said pin and clamped at its outer periphery between two interfitted peripheral wall portions of the diaphragm chamber, one of said wall portions being integral with said housing base and said diaphragm chamber having passage means therein adapted to be connected to a source of fluid pressure; a spring in said diaphragm chamber biasing said diaphragm so as normally to locate said pin in said one position thereof; said diaphragm being movable in response to a predetermined pressure differential thereacross so as to retract said pin to its other position and thereby permit movement of said indicator disc to said second position in which said warning indication is visible in said window.

3. A pressure-responsive visual warning device comprising: a housing of plastic material having a substantially planar wall forming a base portion, a side wall portion extending from the plane of said base and having an edge portion spaced therefrom; said edge portion having a recess formed therein; a front panel with a peripheral edge secured to said side wall in snap-fitting relation in said recess and being in spaced overlying relation to said base; said front panel having an inspection window therein; an integral post on said base extending toward said front panel; a plastic indicator disc having a hub portion with a bore therein adapted to be snap-fitted over said post and rotatable thereon between a first and a second operative position; said indicator disc having a portion with a warning indication thereon which is concealed from view by the front panel when the disc is in the first operative position and visible through said window when in its second operative position; a spring tending to rotate said disc from its first to its second operative position; a retainer pin extending through an opening in said base toward said front panel and movable therein in an axial direction parallel to the axis of said post from one position in which a first end protrudes into an opening in said indicator disc to another position with said first end disengaged from said indicator disc; said indicator disc overlying said first end of the retainer pin to prevent movement of said pin to its first position until said opening in the indicator disc and said pin are aligned; said hub portion of the indicator disc extending through an opening in said front panel to permit manual rotation of the disc from its second operative position to its first whereby said first end of the pin is permitted to move back to its protruding position in which the disc is held against movement to the second position thereof; an annular wall integral with said base and extending therefrom on an opposite side than said side wall portion; a cup-shaped molding member of plastic having an open end formed by an annular edge; complementary interfitting annular projections and recesses on said annular wall and said edge of the molding member by which the two parts are snap-fitted together to define a diaphragm chamber therebetween; a flexible diaphragm secured at its central portion to the other end of said pin and clamped at its outer peripheral edge between said annular wall and said molding member and forming a seal therebetween; said diaphragm chamber having passage means therein adapted to be connected to a source of fluid pressure; a spring in said diaphragm chamber biasing said diaphragm so as normally to locate said pin in said one position thereof; said diaphragm being movable in response to a predetermined pressure differential thereacross so as to retract said pin to its other position and thereby permit movement of said indicator disc to said second position in which said warning indication is visible in said window.

* * * * *